United States Patent [19]

Berninger

[11] 4,333,348

[45] Jun. 8, 1982

[54] LIQUID-FILLED PRESSURE GAUGE

[75] Inventor: Helmut Berninger, Eisenbach, Fed. Rep. of Germany

[73] Assignee: Alexander Wiegand GmbH u. Co., Klingenberg, Fed. Rep. of Germany

[21] Appl. No.: 934,979

[22] Filed: Aug. 18, 1978

[51] Int. Cl.² ............................................. G01L 7/04
[52] U.S. Cl. ...................................... 73/708; 73/732; 73/431
[58] Field of Search ................ 73/708, 300, 738, 739, 73/732–737, 740–743, 431

[56] References Cited

U.S. PATENT DOCUMENTS

| | | | |
|---|---|---|---|
| 3,080,758 | 3/1963 | Decker | 73/708 |
| 3,837,225 | 9/1974 | Alinari | 73/300 |
| 4,006,639 | 2/1977 | Wetterhorn | 73/708 |

Primary Examiner—Donald O. Woodiel
Attorney, Agent, or Firm—Sprung, Felfe, Horn, Lynch & Kramer

[57] ABSTRACT

A liquid-filled pressure gauge comprising a cup-shaped housing in which a metering element is located whose interior is subjected to the pressure to be measured. The front side of said housing is covered by a stiff face plate on whose inner side a transparent, resilient membrane is disposed in spaced relation which seals off the interior of said housing and which is deflected during temperature-related changes in the volume of the liquid filling. The space between the membrane and the face plate is vented externally. The transparent membrane ensures pressure compensation in the interior of the housing, while the stiff face plate protects the pressure gauge from damage to the front.

6 Claims, 3 Drawing Figures

LIQUID-FILLED PRESSURE GAUGE

FIELD OF THE INVENTION

This invention relates in general to liquid-filled pressure gauges and in particular to pressure gauges comprising a housing in which there is located a transparent face plate at the front side, a metering element in the interior, a metering element support, one end of which projects beyond said housing and the other end of which projects into the interior of said housing and supports the metering element at one end, and further comprising a pointer train including a pointer articulately connected to the other end of said metering element, the position of said pointer being observeable through the face plate.

The pressure of a fluid is measured by such a pressure gauge in such a way that the metering element is acted upon or subjected in its interior to the pressure to be measured, thereby deforming it. This deformation causes the end connected to the pointer train to move so that the pointer in displaced at least approximately proportional to the deflection of the end of said metering element and thus at least approximately proportional to the pressure to be measured. The position of the pointer can be read off a dial, for example.

Pressure gauges are already known which are filled with a liquid, e.g. glycerin. This liquid filling serves on the one hand to protect the elements in the interior of the housing from corrosion and, on the other hand, to dampen vibrations transmitted to the pressure gauge in order to minimize wear, in particular of the movable parts of the pressure gauge. The pressure of the liquid filling also acts on the metering element. This results in the following disadvantage. When the temperature surrounding the pressure gauge varies, there is also a change in the temperature of the liquid in the housing which attempts to expand or contract accordingly. Since the liquid is enclosed in the housing, it cannot undergo such a change in volume without hindrance so that as the ambient temperature varies the pressure of the liquid in the interior of the pressure gauge changes, thereby leading to errors in indication of the pressure to be measured.

To solve this problem pressure compensation devices have already been suggested for pressure gauges. These pressure compensation devices include an elastic bellows or an elastic membrane provided in the back of the housing which partitions off a space vented to the surrounding atmosphere from the interior of the housing. The changes in the volume of the liquid filling are absorbed by deforming the bellows or membrane. Examples of such pressure compensation devices are shown in U.S. Pat. Nos. 3,938,393 and 3,080,758 as well as in published German patent application No. P 2,249,266. These known pressure compensation devices are disadvantageous, however, since auxiliary elements must be installed which take up a certain amount of space in the interior of the pressure gauge, thereby enlarging its size, and which increase the cost of the pressure gauge as well.

For pressure compensation in liquid-filled pressure gauges it is also known to design the face plate to be resilient so that it can comply with the changes in the volume of the liquid filling in the housing which are caused by the temperature changes. The temperature changes are thus accompanied only by minor changes in the pressure of the liquid filling. Examples of such pressure compensation devices are illustrated in U.S. Pat. Nos. 3,080,753 and 4,006,639. The resiliency of the face plate is achieved in that it is manufactured from appropriately thin or soft material. This, however, is disadvantageous because the face plate no longer provides adequate protection for the pressure gauge, since it can easily be destroyed owing to its low strength, for example when a hard object inadvertantly hits the face plate. If the face plate is destroyed, the entire pressure gauge is useless. Hence, a pressure gauge with a pressure compensation device in the form of a resilient face plate must be excluded for practical purposes.

SUMMARY OF THE INVENTION

The object of the invention is to eliminate the aforementioned disadvantages.

Another object of the invention is to provide a liquid-filled pressure gauge comprising a pressure compensation device which takes up little room and which is low in cost.

Yet another object of the invention is to provide a liquid-filled pressure gauge the front side of which can yield to volume changes in the liquid filling in order to effect pressure compensation, but which nevertheless is adequately protected to prevent damage to the front side thereof.

The face plate consists of stiff material in the inventive liquid-filled pressure gauge. An elastic membrane of transparent material is located on that side of the face plate which faces the interior of the housing, thereby sealing the front of the housing. The membrane is arranged in at least partially spaced relation to the inside of the face plate.

On the basis of the inventive construction, a compensation or equalization chamber is located behind the stiff face plate of sufficient strength which is positioned externally on the front on the housing. The compensation chamber communicates with the surrounding atmosphere and is defined on the side facing the interior of the housing by the transparent elastic membrane. This membrane, which in no way impairs the view of the pointer and the dial, is so resilient that it follows volume changes in the liquid filling with practically inappreciable resistance so that the pressure of the liquid filling always equals the ambient pressure and errors due to pressure changes in the liquid filling do not occur. Since the compensation chamber continuously communicates with the surrounding atmosphere the volume of the compensation chamber can adapt without hindrance to the deflection of the transparent membrane. The resilience of the membrane, however, does not enhance the risk of damage to the pressure gauge, since the stiff face plate which adequately protects the transparent membrane is positioned in front of the membrane. The transparent membrane can therefore be regarded as a second face plate. Likewise, the stiff face plate and the transparent membrane together can be regarded as a double face plate with an integrated compensation chamber.

Since the housing of the pressure gauge already includes an aperture at its front as well as means which serve to mount and seal the stiff face plate, and since the elastic membrane is advantageously squeezed between the front edge of the circumferential housing wall and the stiff face plate, the inventive design requires none or only very minor changes in the conventional elements of the pressure gauge. Additional openings in the housing for pressure compensation devices in the form of bellows or membrane chambers are unnecessary. The required space for the transparent membrane is extremely small.

Other objects, features and advantages of the invention are revealed in the following description of embodiments with reference to the drawings and to the patent claims.

DETAILED DESCRIPTION OF THE DRAWINGS

Figure 1:
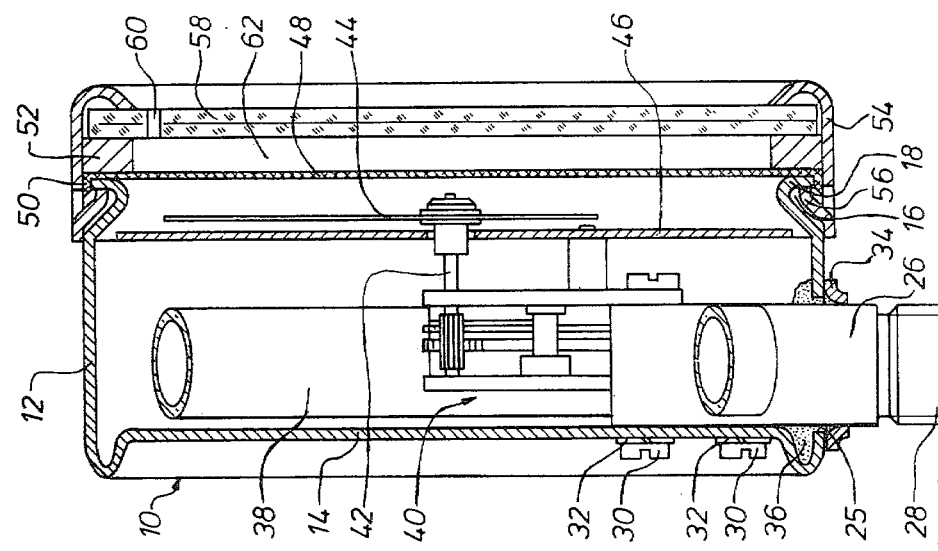
FIG. 1 shows a vertical section through a preferred embodiment of the pressure gauge.

The pressure gauge depicted in FIG. 1 comprises a housing 10 including a cylindrical circumferential wall 12 and a rear wall 14. The housing is manufactured of deep-drawn sheet metal and the cylindrical circumferential wall 12 has at its front end (on the right in FIG. 1) an annular recess 16 which is engaged by a beaded shoulder 18, thereby forming an approximately planar, externally directed support surface.

A metering element support 26 is inserted through an aperture 25 in the lower section of the circumferential wall 12 such that the connection 28 of said support projects out of the housing 10. The support 26 is screwed tightly to the rear wall 14 with the aid of screws 30 and washers 32. The gap between the metering element support 26 and the aperture 25 is sealed by a sealant 36 and a ring 34 which is externally pressed against the housing.

A metering element in the form of a Bourdon spring 38 is firmly connected to the metering element support 26. The interior of said metering element or Bourdon spring communicates with a bore not shown in the metering element support. The Bourdon spring is subjected to the pressure to be measured through this bore. The free end of the Bourdon spring is articulately connected to a pointer train 40 by means not shown. This pointer train is known per se and will therefore not be described in detail in this context. The pointer train 40 converts the displacement of the free end of the Bourdon spring into a rotation of a pointer shaft 42 on which a pointer 44 is situated.

A dial 46 indicating the position of the pointer 44 is attached to the pointer train 40.

The pressure gauge is already known per se in the scope in which it has been described up to this point. The pressure gauge can also include other elements known per se such as an opening (not shown) for filling the liquid filling into the housing as well as a closure element that can be blown off. Such elements are not explained nor described here, as they are not required for comprehension of the invention.

A transparent membrane 48 of elastic material is arranged on the shoulder 18 of the housing 10 in the plane of the support surface. This membrane is so resilient that it is deflected toward both sides when there is a difference between the pressures until the pressure difference has been reduced to practically zero. An annular flange 50 is formed on the edge of the membrane 48 and externally encompasses the shoulder 18. A spacing ring 52 externally abuts against the edge of the membrane 48. A transparent face plate 58 which in the illustrated embodiment is designed as a flat disc of safety glass abuts in turn on the outer side of said spacing ring. A hole 60 is formed in the face plate 58 near its rim, for example. The membrane 58, the spacing ring 58 and the face plate 58 are held against the circumferential wall 12 of the housing 10 by a front ring 54. This is pushed onto the forward end of the circumferential wall and has at least one clamp 56 which engages the recess 16. The front end of the front ring 54 (at the right in FIG. 1) is beaded inwardly in such a manner that its free rim is supported on the face plate 58. Owing to the elasticity of the clamps 56 and the beaded rim of the front ring 54, the face plate 58, the spacing ring 52 and the transparent membrane 48 are pressed against the support surface on the shoulder 18 with sufficient elasticity. If the material of the membrane 48 is chosen suitably, the sealing effect produced between the edge of the membrane and the support surface on the shoulder 18 is sufficient to seal off the interior of the housing 10.

The transparent membrane 48, the spacing ring 54 and the face plate 58 define between themselves a compensation chamber 62 which communicates through the hole 60 with the surrounding atmosphere.

In a conventional manometer of the type illustrated in FIG. 1, i.e. a manometer without a transparent membrane 48, a sealing ring is positioned between the face plate 58 and the support surface on the shoulder 18. In the inventive pressure gauge the transparent membrane 48 and the spacing ring 52 require the same or an only slightly larger mounting space than for the sealing ring in a conventional pressure gauge. In order to be able to install the transparent membrane 48 and the spacing ring 52, only a minor lengthening of the front ring 54 is required at most.

The interior of the pressure gauge as defined by the housing 10 and the transparent membrane 48 is filled with liquid. When the liquid filling expands due to an increase in temperature, for example, the transparent membrane 48 will be deflected outwardly, i.e. to the right in FIG. 1, and the volume of the compensation chamber 62 will decrease. Since the transparent membrane follows the increase in the volume of the liquid filling, the increase in temperature of the liquid filling does not result in an undesirable increase in pressure in the interior of the housing. The front of the pressure gauge is adequately protected by the stiff face plate 58 which is sufficiently strong and is located in front of the transparent membrane 48.

Preferred materials for the transparent membrane 48 are transparent plastics.

Figure 2:
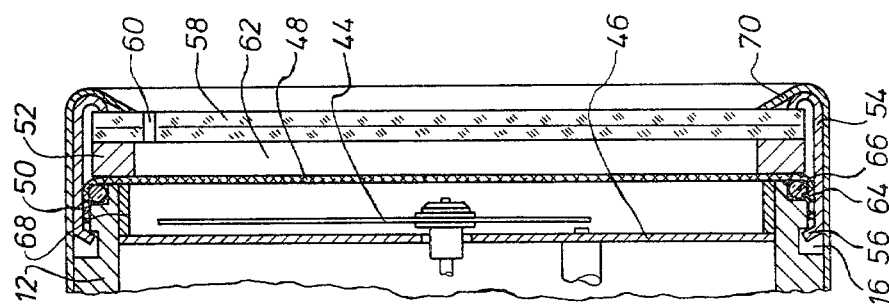
FIG. 2 shows a partial view of the front area of another embodiment of the pressure gauge.

Another embodiment of an inventive pressure gauge is shown in FIG. 2, whereby the rear section has been omitted. In FIG. 2 the same reference numerals designate the same elements as in the embodiment according to FIG. 1. The embodiment according to FIG. 2 differs from the embodiment according to FIG. 1 in that the housing is manufactured of metal, e.g. brass, by a high-pressure die casting method and an annular groove 64 is formed in the front rim of the circumferential wall 12. An O-shaped circular seal 66 is located in this annular groove, abuts internally on the edge of the transparent membrane 48 and ensures improved sealing of the interior of the housing. A facing ring 58 is located between the transparent membrane 48 and the dial 46. A sleeve 70 has been slid over the front ring 54 and circumferential housing wall 12 and has been clamped to the wall 12.

In a conventional pressure gauge without a transparent membrane 48, the internal edge of the face plate 58 abuts directly on the O-shaped circular seal 66. Hence, only a slight extension of the front ring 54 is required in order to install the transparent membrane 48 and the spacing ring 52.

The mode of function of the embodiment according to FIG. 2 is the same as the mode of function of the embodiment according to FIG. 1.

Figure 3:
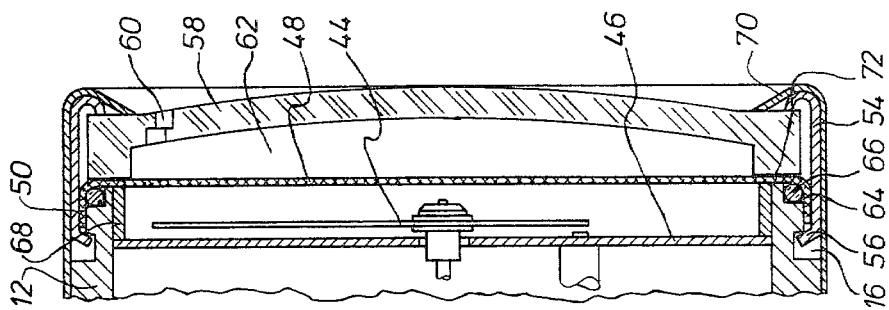
FIG. 3 shows the front area of yet another embodiment of the pressure gauge.

FIG. 3 illustrates another embodiment of an inventive pressure gauge, the rear section having again been omitted. The embodiment according to FIG. 3 differs from the embodiment according to FIG. 2 merely in that it has no spacing ring and that, instead of a planar face plate of safety glass, a face plate 58 is provided which consists of a slightly convex plastic disc with an inner flat edge 72 which abuts directly on the edge of the membrane 48. The space required for the compensation chamber 62 is thus obtained by virtue of the convex curve of the face plate 58. It is therefore not necessary to lengthen the front ring 54. The compensation device in the form of the transparent membrane 48 and the externally vented compensation chamber 62 thus requires a minimum of additional mounting space and no modifications of the other elements of the pressure gauge. The embodiment according to FIG. 3 is thus characterized by the smallest space requirements and very low additional costs. Its mode of function coincides with that of the embodiment according to FIG. 1.

Although the invention was explained and discussed above with reference to special embodiments, it is not restricted solely to these embodiments. Numerous modifications and changes are possible without departing from the scope and spirit of the invention defined by the following claims. Some of the possible modifications of the afore-described embodiments, for example, include an alteration of the embodiment according to FIG. 3 in which the face plate and the transparent membrane are firmly secured to one another or, in an alteration of the embodiments according to FIGS. 1 and 2, the face plate, the spacing ring and the transparent membrane are firmly secured and glued to one another by means of adhesives or fusion, for example, prior to being installed in the pressure gauge so that these elements together form a double face plate with an integrated compensation chamber. Moreover, the embodiment according to FIG. 3 can be modified such that the membrane 48 and not the face plate 58 is integral with the rim 72, the face plate then being clamped, cemented or otherwise connected to the rim 72. The essential point is that the front side of the housing of the pressure gauge is closed off by two transparent elements which define between themselves an externally vented compensation chamber and of which the outer element has the required mechanical strength to protect the pressure gauge and, if need be, to protect others from a faulty pressure gauge, and of which the inner element is so resilient that it substantially eliminates pressure differences on both sides thereof by deflection or displacement.

What we claim is:

1. A liquid-filled pressure gauge, comprising
   a housing including a circumferential wall, a rear wall and a front side,
   a transparent face plate on the front side of said housing,
   a metering element in the interior of said housing,
   a metering element support one end of which projects out of the housing on the other end of which projects into the interior of said housing and supports the metering element at one end,
   a pointer train having a pointer which is articulately connected to the other end of said metering element and whose pointer position can be observed or viewed through the face plate,
   wherein the face plate consists of a stiff material,
   wherein an elastic membrane of transparent material which seals off the front side of the housing is located on the side of said face plate which faces the interior of said housing,
   wherein the membrane is disposed in at least partially spaced relation from the interior side of said face plate
   and wherein the space between said face plate and said membrane is vented externally.

2. A pressure gauge according to claim 1, wherein the face plate is a planar disc of safety glass and wherein a spacing ring is disposed between the edge of said face plate and the edge of said membrane.

3. A pressure gauge according to claim 1, wherein the face plate is a slightly convex disc of plastic with an edge which is flat on the inner side on which the edge of said membrane abuts directly.

4. A pressure gauge according to one of claims 1 to 3, wherein an annular flange is formed on the edge of said membrane and abuts externally on the circumferential wall of the housing.

5. A pressure gauge according to claim 1, wherein an annular groove is formed in the front edge of the circumferential wall of said housing in which an O-shaped circular seal is located which sealingly abuts on the edge of said membrane.

6. A pressure gauge according to claim 1, wherein the compensation means possesses a volume stiffness which is purposely selected to be larger than 0.007 bar per percent by volume increase in the liquid filling and thus the temperature error of the gauge, which results on the one hand from the counteracting display errors owing to the temperature-induced change in the volume of the filling liquid and on the other hand from the temperature-induced change in the modulus of elasticity of the metering element, is as small as possible.

* * * * *